April 16, 1946.　　　H. KELLER　　　2,398,647

RECTIFIER WITH CONTROL ELECTRODES

Filed Sept. 15, 1942

Inventor:
Hans Keller,
By Pierce + Scheffler,
Attorneys.

Patented Apr. 16, 1946

2,398,647

UNITED STATES PATENT OFFICE 2,398,647

RECTIFIER WITH CONTROL ELECTRODES

Hans Keller, Wettingen, Switzerland, assignor to Aktiengesellschaft Brown, Boveri & Cie, Baden, Switzerland Application September 15, 1942, Serial No. 458,418 In Switzerland September 17, 1941

8 Claims. (Cl. 315—269)

In rectifiers having capacity control for obtaining a uniform voltage distribution along the discharge path between the anode and cathode or for regulating the electrical field at the insulated anode bushing it has been found that the potentials of the electrodes attained from the surroundings do not correspond to the prevailing ambient capacitive voltage distribution. For this reason it has been proposed to supply the electrodes with a control potential from an external source by means of both series capacities and also a potential divider resistance. The use of series condensers for supplying the control electrodes possesses the disadvantage, however, that the currents of ions flowing from the electrodes over the condensers affect the charging of these latter to such an extent that the potential of remaining condensers of the series is also influenced. This undesirable effect on the control potentials of the electrodes can cause discharges inside the rectifier. When using a voltage divider resistance a similar effect can be noticed.

The present invention concerns a rectifier with control electrodes supplied from an external source for obtaining a uniform voltage distribution in the discharge path between the anode and cathode or for regulating the electrical field at the insulated anode bushing, the aforementioned disadvantages being overcome according to the invention by providing each control electrode serving the same control purpose with its own source of potential connected between the main rectifier electrodes of different polarity.

Constructional examples of the invention showing the control of the discharge path between the anode and cathode of a rectifier are illustrated diagrammatically in Figs. 1, 2, 3, 4 and 5 of the accompanying drawing.

Figure 1:
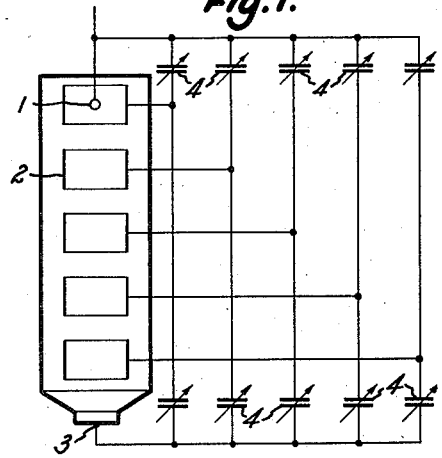

In Figure 1 the reference numeral 1 indicates an anode and 3 the cathode of a rectifier, whilst 2 are the control electrodes which are controlled from an external source. By providing each control electrode 2 with its own source of potential as by means of condensers 4, the potential of these electrodes is definitely determined. A change in voltage of one of the control electrodes cannot produce any alteration in the voltages of the other control electrodes. By this means it is possible to adjust individually the charging currents of the condensers from the control electrodes.

Figure 2:
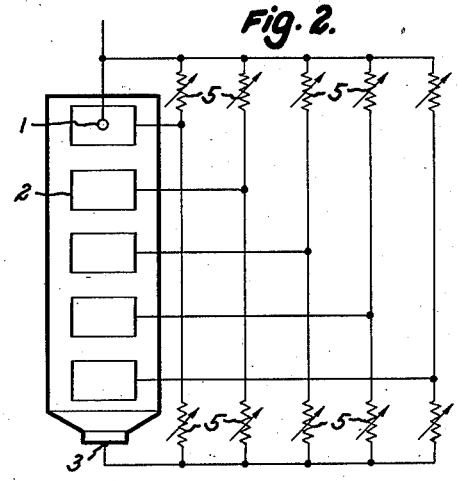
Figure 3:
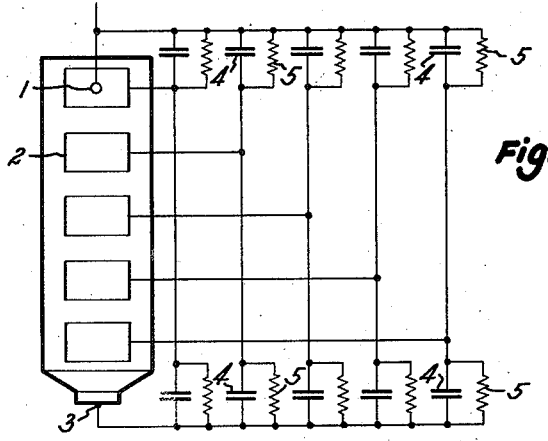

Instead of the condensers 4 it is also possible to employ resistances 5, as shown in Fig. 2. The simultaneous use of resistances 5 and condensers 4, as shown in Fig. 3 for each control electrode also enables undesirable condenser charges to be conducted away. The condensers 4 and resistances 5 serving as sources of potential for the control electrodes are given various magnitudes. In order to be able to adjust the magnitude of the control potential for the electrodes to suit prevailing conditions it is expedient to make the condensers 4 or resistances 5 variable, as shown in Figs. 1 and 2.

When employing capacity voltage dividers as a source of potential for the control electrodes as described above, oscillations may, however, occur which under certain conditions can have a disturbing effect on the control and may even be the cause of back-arcing in the rectifier. It is therefore necessary to reduce the currents in the control circuits causing these oscillations to a value at which they are harmless.

According to a further embodiment of the invention this necessary current limitation is achieved by arranging current reducing means between the main electrodes of the rectifier of different polarity and the points where the capacity voltage dividers are connected to the control electrodes. Resistances or reactors or a combination of both can be used as current-limiting devices.

Figure 4:
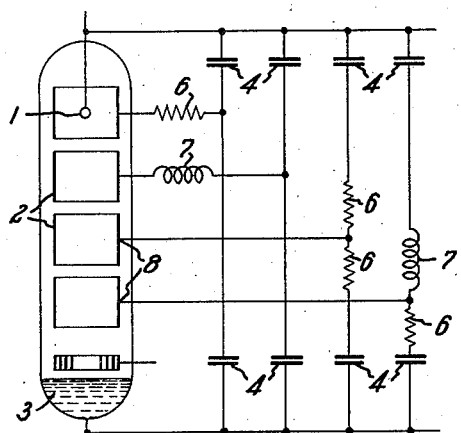

A constructional example of this feature of the invention is illustrated in Fig. 4 of the drawing where a rectifier similar to that shown in Fig. 3 is shown diagrammatically.

Figure 5:
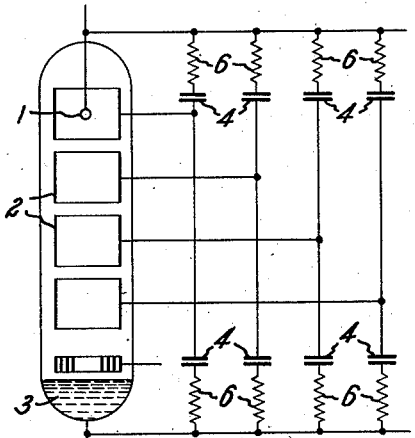

In Fig. 4 the reference numeral 1 again indicates the anode and 3 the cathode of the rectifier, whilst 2 are the control electrodes each of which is connected to an external control voltage in the form of condensers 4. In order to limit the current in the individual control circuits, resistances 6 or reactance coils 7 are located between the main electrodes 1, 3 of the rectifier and the points 8 where the capacity voltage dividers are connected to the control electrodes 2. These resistances 6 or coils 7 can either be located in the voltage dividers themselves or between these latter and the control electrodes 2. Instead of either of these arrangements it is also possible to arrange a resistance 6 or reactance coil 7 between the anode 1 and condenser 4 on the one hand and between the cathode 3 and the other condenser 4 of each control circuit on the other hand, as is indicated in Fig. 5.

It is not necessary to employ only resistances or reactors for reducing the current. If it is found to be expedient a combination of both means can be used as is indicated in Fig. 4 in connection with the lowest control electrode.

I claim:

1. A rectifier of the gas-filled type including an anode, a cathode, a plurality of control elements spaced along the discharge path between the cathode and anode, and means for establishing a potential gradient along said control elements, characterized by the fact that said means comprises individual voltage divider circuits connecting each control element between said anode and said cathode, whereby the potential established at each control element is independent of potential variations developed on other control elements by space currents.

2. A rectifier as recited in claim 1, wherein each voltage divider circuit includes an impedance adjustable to vary the potential established on the associated control element independently of the potentials established on other control electrodes.

3. A rectifier as recited in claim 1, wherein each voltage divider circuit comprises a pair of impedances of mixed character connected between said anode and cathode, and a connection from the junction of said mixed impedances to the associated control element.

4. A rectifier as recited in claim 1, wherein current-limiting impedance is included in each voltage divider circuit.

5. A rectifier as recited in claim 1, wherein current-limiting means is located in the connection between each control element and its associated voltage divider circuit.

6. A rectifier as recited in claim 1, wherein each voltage divider circuit includes, between the associated control element and respectively the anode and cathode, a reactance and a resistance.

7. A rectifier as recited in claim 1, wherein each voltage divider circuit includes, between the associated control element and respectively the anode and cathode, a reactance and a resistance in parallel.

8. A rectifier as recited in claim 1, wherein each voltage divider circuit includes, between the associated control element and respectively the anode and cathode, a reactance and a resistance in series.

HANS KELLER.